(12) United States Patent
Wang et al.

(10) Patent No.: US 10,788,354 B2
(45) Date of Patent: Sep. 29, 2020

(54) BALL FLOAT TYPE LIQUIDOMETER WITH VERNIER DISPLAY

(71) Applicant: DALIAN JIAXIN ELECTROMECHANICAL INSTRUMENT CO. LTD., Dalian, Liaoning Province (CN)

(72) Inventors: Jiaxian Wang, Dalian (CN); Ao-an Wang, Dalian (CN); Xiaori Wang, Dalian (CN); Zhenqiang Gao, Dalian (CN)

(73) Assignee: DALIAN JIAXIN ELECTROMECHANICAL INSTRUMENT CO. LTD., Dalian, Liaoning (CN)

(*) Notice: Subject to any disclaimer, the term of this patent is extended or adjusted under 35 U.S.C. 154(b) by 260 days.

(21) Appl. No.: 15/777,487

(22) PCT Filed: Oct. 20, 2016

(86) PCT No.: PCT/CN2016/102648
§ 371 (c)(1),
(2) Date: May 18, 2018

(87) PCT Pub. No.: WO2017/084466
PCT Pub. Date: May 26, 2017

(65) Prior Publication Data
US 2018/0348045 A1 Dec. 6, 2018

(30) Foreign Application Priority Data

Nov. 18, 2015 (CN) .......................... 2015 1 0815681
Nov. 18, 2015 (CN) ..................... 2015 2 0942785 U

(51) Int. Cl.
*G01F 23/46* (2006.01)
*G01F 23/30* (2006.01)
(Continued)

(52) U.S. Cl.
CPC .............. *G01F 23/46* (2013.01); *G01F 23/30* (2013.01); *G01F 23/72* (2013.01); *G01F 23/76* (2013.01)

(58) Field of Classification Search
CPC .......... G01F 23/46; G01F 23/72; G01F 23/30; G01F 23/76
(Continued)

(56) References Cited

U.S. PATENT DOCUMENTS 7,353,704 B2 * 4/2008 Clanton .................. G01F 23/42
242/615
2005/0235749 A1 * 10/2005 Morris ................ G01F 23/0023
73/313

(Continued)

FOREIGN PATENT DOCUMENTS

CN          101726344 B  * 11/2011

*Primary Examiner* — Randy W Gibson
*Assistant Examiner* — Gedeon M Kidanu
(74) *Attorney, Agent, or Firm* — Proi Intellectual Property US; Klaus Michael Schmid

(57) ABSTRACT

Disclosed is a ball float type liquidometer with moving indicator, comprising a ball float chamber and a ferromagnetic spherical ball float provided therein, a moving indicator outside the ball float chamber, a calibrated scale and a moving indicator guide rail, wherein the moving indicator comprises a magnetic steel member, a frame and a rolling system which is horizontally fixed and sheathed in the frame; the rolling system comprises rolling wheels provided with radial grooves along a circumferential surface, rolling bearings and shafts; the magnetic steel member is located between the ball float chamber and the frame and is fixed outside one side face close to the ball float chamber on the frame, and a magnetic pole of the magnetic steel member is directly oriented towards the ball float.

20 Claims, 5 Drawing Sheets

(51) Int. Cl.
*G01F 23/72* (2006.01)
*G01F 23/76* (2006.01)

(58) Field of Classification Search
USPC ......... 73/448, 454, 1.33, 861.57, 305, 322.5
See application file for complete search history.

(56) References Cited

U.S. PATENT DOCUMENTS

2008/0210003 A1\* 9/2008 Schulz ..................... H01P 1/08
  73/290 V
2012/0234092 A1\* 9/2012 Lauder ................... G01F 23/42
  73/305

\* cited by examiner

BALL FLOAT TYPE LIQUIDOMETER WITH VERNIER DISPLAY

FIELD OF THE INVENTION

The invention relates to a liquid level measuring device, in particular to a ball float type liquidometer with moving indicator display.

BACKGROUND OF THE INVENTION

The existing local indicating liquid level gauges include glass plates, magnetic flaps (column), buoys, and two-color water level gauges. The glass plate type can only be measured visually at a close distance. After covering the dust or being contaminated by the medium, visual inspection is difficult and the pressure resistance is limited. The structure of the magnetic flap (column) type is relatively complex, and it is easy to appear garbled. In addition, the magnetic steel in the ball float still has the problem of high temperature demagnetization, which affects its long-term use, such as, For the imported magnetic ball float liquid liquidometer, although it is resistant to high temperature, the ball float thereof has to be replaced because of the demagnetization of the magnetic steel therein after 4~5 years. The two-color water gauge is suitable for a narrow range of media and has a limited pressure resistance. In addition, glass plate level gauges or two-color water level gauges cannot be insulated, resulting in high energy consumption.

For example, the Chinese patent ZL93213461.0, which has the advantages of simple structure, and improved temperature range. The buoyancy of the liquid on the moving indicator located in the moving indicator moving indicator tube reduces the load of the floater. However, it has the following shortcomings: Both the floater and the moving indicator are sliding friction, resulting in a large coefficient of friction and large frictional forces that affect the accuracy and sensitivity of the measurement, and wherein the instrument is even unusable. This can be seen from the calculation results in the description of another Chinese patent ZL200910219681. X.

Another example is the Chinese patent ZL9923472.9, which also has the advantages of simple structure and improved temperature range. However, it also has the shortcomings of what the previous patent has, that is, because of the large friction, the accuracy and sensitivity of measurement are affected, so that the instrument is unusable.

Another example is the Chinese patent ZL88218650.7, which has the advantage of simple structure and at the same time changing the liquid level indicator (buoy) to a ball, greatly reducing the friction. Its shortcomings lie in: 1. The floater is sliding friction, which results in large friction coefficient and friction, which affects the accuracy and sensitivity of the measurement. 2. The magnetic steel in the floater ring increases the weight of the floater, which is bound to increase the volume of the floater. 3. the demagnetization temperature of the magnetic steel limits the use temperature of the liquid meter.

Another example is the Chinese patent ZL200410015416.7, the level gauge better solves the application of high pressure boilers, but the magnetic car needs 4 wheels and other components, otherwise the moving indicator will be deflected or shaken up and down and can not be used, which makes the structure complex, Secondly, the weight of the magnetic vehicle is increased, thereby increasing the load of the float, which corresponds to an increase in the weight of the float, which is difficult to satisfy the use in high-temperature high-pressure or high-pressure low-density medium applications, and the remote signal is discontinuous; meanwhile, the sliding friction between the floater and the floater chamber thereof has a large friction force described above, and then affects the accuracy and sensitivity of the measurement.

Some of the existing liquid level gauges mentioned above have high unsafe risks due to the high surface temperature, such as easy-to-scald-people, or fire or explosion which caused by flammable and explosive media.

Another example as China Patent ZL200910219684.3, wherein the floater-type level gauge with a buoy is used in a high-temperature high-pressure or high-pressure low-density medium applications, the structure of the buoy is complicated, and the manufacturing cost tends to be high. With many parts and components, the failure rate is high, which affects the reliability of use and leads to high maintenance costs. In addition, the installation of magnetic steel in the ball float is restricted by the high temperature demagnetization thereof, so that The two hemispherical shells of the ball float cannot be welded and thus making the ball-float-manufacture difficult. The problem of high temperature demagnetization do exist with the magnetic steel thereof when using.

Similarly, there is the same problem as described above for a float level gauge with an on-site indication in the Chinese patent ZL200910219681. X.

Again as in Chinese patent application CN103411652, the disclosed floater is non-spherical and has a large frictional force and has similar problems to the aforementioned patents. In addition, there is a track in the oil mark holder, a fan-shape magnetic indicator is set in the track. Although the center of gravity of the oil mark holder of this structure is below, it is difficult to ensure that the oil mark holder is vertical, that is, the oil marker holder can easily deviate gradually from its original position in multiple up and down movements.

In addition, Another example as the Chinese patent ZL201210140345.8, wherein the moving indicator has an axis, a connecting rod and a heavy hammer to ensure that the center of gravity of the moving indicator is below. Even so, it is still difficult to ensure that the axis of the axis thereof is horizontal, that is, it is difficult to ensure that the up-and-down motion of the moving indicator is vertical. In fact, it will be gradually deviate in the process of using. In the case where the measuring range of the liquid level is small, it can be used normally. Whereas the measuring range is large, careful adjustment is required. Otherwise, the possibility of deviation increases or the distance of deviation increases, that is, there is a problem of accuracy or reliability. In addition, the axis, connecting rod and the heavy hammer on the moving indicator will result in several questions 1. Increase the weight of the moving indicator; 2. Increase the mechanical friction so as to affect the accuracy; 3. Make the structure more complicated, and increase the cost thereof; 4. Affect the reliability for too many parts and components; 5. Affects the accuracy for the uneven radial magnetic force distribution of the magnetic steel.

The above-mentioned similar problems also exist in the level gauge described in the aforementioned Chinese patent application CN103411652.

The applicant further researches on the new related published patent applications in the past two years and found that:

For example, float level gauges with moving indicators or buoys disclosed in Chinese utility model patent ZL201420640215.5 still highlight the following problems:

1. High friction, significant hysteresis, low accuracy: After many times of relative motion tests between various imported linear bearings and various imported linear guides, the friction between linear bearings and linear guides is an unavoidable issue. The friction between domestic linear bearings and linear guides is greater, and none of the corresponding level gauges is very sensitive, with low accuracy and large hysteresis. The inventor has proved by experiments that the upper lag is 3 mm and the backlash is 8 mm. And the linear bearing itself is heavier, it will inevitably increase the weight of the moving indicator. Therefore more magnetic force to couple is required. And then the mechanical friction force is further increased, the buoyancy of the ball float needs to be larger, and all these are to result in more problems accordingly. 2. High cost: Imported linear bearings are about 50 yuan each, linear guides made of aluminum alloy is about 6-7 yuan per meter, and the imported is about 100 yuan per meter. When the range is large, the proportion of the total cost is larger. This does not include other parts on the moving indicator. 3. The rigidity of the guide rail is poor, and the rigidity of the cylindrical linear guide matched with the cylindrical linear bearing decreases with the length of itself. When the moving indicator and the ball float are under the effect of the magnetic coupling force, the guide rail will bend toward the ball float chamber. too much to be usable when the range is too large. This kind of guide rail can not improve its rigidity by installing accessories, otherwise it can not be used. Unless straight line bearings is installed. And if the rigidity of the guide rail need to be increased, the diameter of the guide rail itself must be increased. This will inevitably increase the weight of the linear bearing, which not only would further increase the mechanical friction force, but also would cause the ball float to sink into the liquid and even to be unusable because of the increase in weight. 4. Too many guide rails joints: since the matching accuracy between linear guide rails and linear bearings is very high, and the linear guide is precision-machined subject to the requirements of the rigidity of the guide rail, each guide rail can not be processed very long. When the measurement range of the liquid level is large, a plurality of guide rails are required to be linked together, and the coupling between the ends of the guide rails must ensure the accuracy. And this is difficult. Otherwise, the linear bearing might be stuck at the junction of the two guide rails. On the other hand, increasing the rigidity of the guide rail by diameter thereof to decrease of the number of the joints, will inevitably increase the size of the linear bearing, thereby increasing the weight of the moving indicator. And this load will result in sinking the ball float into the liquid and making the level gauge unusable. 5 Unable to repair the bearing. The structure of the linear bearing itself determines that it is difficult to clean once entering the impurities. In that case it must be updated and thus the cost will be further increased.

The current buoyancy level gauge can be used in high temperature and high pressure applications. Subject to the temperature resistance of the electronic components thereof, the parts near the transmitter is not allowed to be insulated or even the cooling fin is needed, which leads to the energy consumption and empyrosis.

Magnetic ball float level gauges imported from Europe and the United States and other countries are expensive, 5-10 million yuan each. It not only has the problem of not being able to withstand high temperatures and high pressure at the same time, but also has the problem of demagnetization at high temperatures thus after using several years, the magnetic ball float will need to be replaced. Every time a magnetic ball float is replaced, it needs to be disassembled, replaced, sealed, hydrostatically tested, and airtightly tested. The price of each high-temperature magnetic float is more than 10,000 yuan. As we know that the service life of imported magnetic ball floats is about 4 to 5 years in high temperature, and the overhaul period of equipments in petrochemical industry is 3 years. And so an imported magnetic ball float shall be replaced for 3 years. It can be seen that the cost of it is too high.

DESCRIPTION OF THE INVENTION

In view of the above problems existing in the prior art, this invention aims to provide a high-precision and low-cost ball float type liquidometer, which has a more simple and scientific structure, is reliable in use, and is easy to manufacture, remedies the defects of the prior art, and effectively satisfies the needs of related fields.

The solution of the invention is implemented in this way:

A ball float type liquidometer with moving indicator comprises: a ball float chamber, a ball float of ferromagnetic material, a calibrated scale, a moving indicator and a guide rail thereof outside of the ball float chamber, wherein the moving indicator comprises a magnetic steel member, a frame, and a rolling system that is fixed horizontally and sheathed in the frame;

wherein the rolling system comprises a rolling wheel, rolling bearings and a shaft, which three are coaxial; the rolling wheel is provided with a radial groove along the circumferential surface of the rolling wheel; the inner ring of the rolling bearing matches with the shaft, and the outer ring of the rolling bearing matches with the rolling wheel and rotates with it;

wherein the shaft is supported by the frame and is parallel to the ground;

wherein the magnetic steel member is fixed on the outside of one side of the frame, which side is close to the ball float chamber; and a magnetic pole of the magnetic steel member is directly oriented toward the ball float;

wherein the guide rail of the moving indicator is sheathed in the frame between the magnetic steel member and the rolling system;

wherein the rolling wheel, at the radial groove position thereon, is affixed to the working surface of the moving indicator guide rail and rolls up and down along the moving indicator guide rail through the magnetic coupling force between the magnetic steel member and the ball float.

Further, the guide rail of the moving indicator is provided from the top to the bottom on one side thereof close to the ball float chamber with a stifferer so as to improve the rigidity of the guide rail of the moving indicator and further ensure the measurement accuracy of the liquidometer.

Further, viewed from directly above, the shape of the radial groove on the rolling wheel corresponds to the shape of the place where the guide rail of moving indicator is attached.

For example, the guide rail of the moving indicator is a cylindrical guide rail, and the radial groove of the rolling wheel is a concave arc-shaped groove corresponding to the arc surface where the cylindrical guide rail is attached.

The diameter of the concave arc-shaped groove is larger than the diameter of the cylindrical guide rail.

Alternatively, the guide rail of the moving indicator is a cylindrical guide rail, and the radial groove of the rolling wheel is a trapezoidal groove, then the structure of the rolling wheel with a trapezoidal groove is similar to the structure of a belt pulley; the rolling wheel, at least at the two inner slopes formed by the trapezoidal bevels of the trapezoidal groove, fits the working surface of the moving indicator guide rail and rolls up and down along the guide rail through the magnetic coupling force between the magnetic steel member and the ball float.

For another example, the guide rail of the moving indicator is a cuboid-shaped guide rail; and the radial groove of the rolling wheel is a rectangular groove; and the distance between the two inner parallel surfaces of the rectangular groove is larger than the corresponding distance between the two outer surfaces of the guide rail.

Alternatively, further, the rolling system comprises two sets; wherein the two sets of rolling systems one on top of the other are fixed in parallel and sheathed in the same frame, and the plane formed by the two axes thereof is perpendicular to the ground surface. In this way the rotation of the magnetic steel member around the axis during the movement of the moving indicator will be reduced and the accuracy and reliability will be improved.

Further, the liquidometer further comprises a closed moving indicator chamber of non-ferromagnetic transparent material located adjacent to the ball float chamber with the axes of the two parallelling; the moving indicator and the guide rail are installed in the moving indicator chamber. In actual use, the moving indicator is usually placed in a closed box to prevent the effects of rain, snow, ice, and dust from being used.

In order to balance the buoyancy of the ball float and provide an upward lifting force to the ball float, the liquid medium can be further filled in the moving indicator chamber, wherein a buoy is provided. The buoy comprises the moving indicator and a float fixed on the moving indicator.

A float is fixed on the moving indicator to form a buoy, and the liquid medium is filled in the moving indicator chamber to provide a buoyancy for the buoy. In order to facilitate observation, reduce friction, improve measurement accuracy, and avoid the influence of volatiles, the liquid medium in the moving indicator chamber is transparent and has lubricating properties such as transformer oil or cooking oil.

Further, as in the case of high temperature, high pressure or high pressure, low density media, due to the thicker wall of the ball float, the larger specific gravity of the ball float or the specific gravity of the ball float which is larger than that of the measured medium, in order to balance the gravity of the ball float and give the ball float an upward lifting force, the following technical solution may also be adopted: on the basis of the technical solution mentioned above, a fixed pulley system which is further fixed directly above the moving indicator, wherein one end of the connecting rope of the fixed pulley system is connected to a balance hammer and the other end is connected to the frame.

Take the friction force between a cuboid-shaped guide rail and the rolling wheel with rectangular groove as an example: for the force analysis as shown in FIG. 9(a) and FIG. 9(b), set the vertical contact length of the rectangular groove of the rolling wheel and the rectangular guide rail perpendicular to the ground is 40 mm, the weight of the moving indicator is W=40 g, and set the material expansion coefficient of the rolling wheel with rectangular groove is greater than that of the cuboid-shaped guide rail. After heated, the axial clearance between the rolling wheel with rectangular groove and the cuboid-shaped guide rail is 0.1 mm. In this case, the upper end of the rolling wheel may be attached to the outer wall of one side of the guide rail; and the lower end of the rolling wheel may be attached to the outer wall of the other side of the guide rail. The force of the center of the axis of the rolling wheel with rectangular groove is analyzed, and the upward pulling force is F=W=40 g when the moving indicator is balanced with the ball float, and the lateral horizontal component forces N and N' acted on the guide rail by the upper and lower ends of the rolling wheel are:

$$N = N' = \frac{0.05}{\sqrt{20^2 - 0.05^2}} \times F \approx \frac{0.05}{20} \times 40 \text{ g} = 0.1 \text{ g}$$

And the total horizontal force of the upper and lower ends is N+N'=0.1+0.1=0.2 g, and the mechanical friction coefficient of steel to steel is K=0.2. It can be seen that the upper and lower mechanical friction force acted on the moving indicator is (N+N').)×k=0.04 g.

Set that the liquid medium in the ball float chamber is water, and the specific gravity is 1 g/cm3 at 4° C., the diameter D of the ball float is 100 mm, and the ball float is immersed in half of the liquid. The change of buoyancy caused by the change of the liquid level by 1 mm is 5×5×3.14×0.1×1=7.85 g; and it can be seen that the above 0.04 g of mechanical friction will have little effect on the measurement of the liquid level.

Further, the liquidometer further comprises a spare moving indicator which is located in the upper part of the moving indicator chamber and fixed through magnetic force by a magnetic steel which is fixed outside of the moving indicator chamber; for example the magnetic steel outside the moving indicator chamber is fixed outside of the moving indicator chamber by fasteners.

In order to avoid the impurities in the liquid from affecting the rolling of the ball float, a convex ball float guide rail is furnished on the inner wall of the ball float chamber near the moving indicator side so that the ball float will not adhere to the inner wall of the ball float chamber when the ball float moves up and down. For example, two ball float guide rails are furnished.

In order to reduce the friction between the moving indicator and the guide rails thereof, the rolling wheel is coated with polytetrafluoroethylene on the working surface of the groove thereon close contacted with the moving indicator guide rail.

In view of high temperature resistance, high pressure resistance, corrosion resistance and reduction on the specific gravity of the ball float, the ball float with ferromagnetic material is coated with a protective layer of carbon fiber. Due to the low density, high strength, high temperature resistance, and corrosion resistance of carbon fiber, the overall weight of the ball float is reduced, making it suitable for high temperature, high pressure or high pressure, low density medium and corrosive medium at the same time. Similarly, the ball float can also be coated with a protective layer of polytetrafluoroethylene.

Alternatively, in view of high temperature resistance, high pressure resistance and corrosion resistance, the ball float with ferromagnetic material is coated with a high alloy steel protective layer such as 304, 316 or CrMo steel, etc. which is high temperature resistant or the ball float is made of ferromagnetic high alloy steel, such as 2Cr13.

Similarly, for the purpose of corrosion resistance, the ball float chamber can be made of plastic (such as polytetrafluoroethylene) or glass, or the inner wall of the ball float chamber is lined with an anti-corrosion layer.

In order to make the liquid level display conspicuous, the moving indicator is coated with an awake mark such as red and/or with a light emitting layer, and the light emitting layer may be a self-luminescent rare material.

In use, when the ball float and the moving indicator are disengaged, in order to recouple the two together, a magnetic steel may be held in hand to find the position of the ball float, and then pull moving indicator by hand or the magnetic steel is used to draw the moving indicator, when the moving indicator chamber exists, to near the ball float and then let go or remove the hand-held magnetic steel. When it is doubted whether the moving indicator coincides with the ball float in the position, it can be obtained by comparing the location of the ball float found by the hand-held magnetic steel with the location of the moving indicator.

In addition, considering the requirement of heat insulation or cold insulation and achieving energy saving, an heat-insulation layer or a cold-insulating layer may be provided between the outer wall of the ball float chamber and the moving indicator or the moving indicator chamber. The heat-insulating layer may be made of aluminum magnesium silicate material, or nano-ceramic material and silicate, or aluminum silicate fiber, and its thickness may be a few millimeters. The cold-insulating layer may be a cold-insulation material such as polyurethane or urea amine grease. As the distance between the magnetic steel member and the ball float of the liquidometer of the invention can reach 12 millimeters, adopting overall insulation for the ball float chamber can be considered, and the insulating layer does not affect the display at all, thereby realizing energy saving and also slowing down magnet demagnetization.

In order to prevent the magnetic steel member from falling accidentally from a high place, a spring or a soft material may be fixed or filled on the bottom of the moving indicator chamber.

In order to reduce the weight of the spherical ball float, the ball float is made hollow.

In order to realize remote transmission, magneto-sensitive elements are arranged from the top to the bottom of the magnetic steel member.

The working principle and implementation of the ball float type liquidometer with moving indicator are as follows:

The buoyancy $F1$ of the ball float immersed in half of the liquid is equal to the sum of the gravity $G1$ of the ball float, the gravity $G2$ of the moving indicator and the mechanical friction force f, ie $F1=G1+G2+f$.

With balance hammer, when the ball float is immersed in half of the liquid, the buoyancy $F1$ plus the gravity $G3$ of the balance hammer is equal to the sum of the gravity $G1$ of the ball float, the gravity $G2$ of the moving indicator, and the mechanical friction force f, that is, $F1+G3=G1+G2+f$.

The ball float in the ball float chamber is always coupled with the moving indicator. When the liquid level rises or falls, the balance of this force is broken; and so the moving indicator will lift or lower with the ball float as the liquid level rises or falls; and then the liquid level can be read through the pointer of the moving indicator corresponding to the position of the calibrated scale.

Further, when the moving indicator chamber is filled with a liquid medium (the specific gravity of the buoy is smaller than the specific gravity of the liquid medium in the moving indicator chamber), the sum of the buoyancy $F1$ of the ball float immersed in half of the liquid and the buoyancy $F2$ of the buoy is equal to the sum of the gravity $G1$ of the ball float, the gravity $G2$ of the buoy, and the mechanical friction force f, that is, $F1+F2=G1+G2+f$. The ball float and the buoy achieve the balance of force through magnetic coupling force, that is, the magnetic force coupling of the moving indicator to the ball float gives an upward lifting force to the ball float in the ball float chamber. The ball float in the ball float chamber is always coupled with the moving indicator. When the liquid level of the ball float chamber rises or falls, the balance of this force is broken; and so the buoy will lift or lower with the ball float as the liquid level rises or falls; and then the liquid level can be read through the pointer of the moving indicator corresponding to the position of the calibrated scale.

Compared with the prior art, the beneficial effects of the technical solution of the invention are obvious, comprising:

The followability of the moving indicator (or the magnetic steel member) and the ball float is excellent, the lag is small, and the precision is extremely high. The structure of the moving indicator is simple and lightweight; and the relevant parts are made of aluminum, and small, thin, and light. The reduction in weight means that the coupling can be achieved with small magnetic steel or a small magnetic force so as to achieve further reducing the friction and increasing the accuracy. It does not have the problems of garbled appearance, complicated structure, many parts and high cost of the magnetic flap liquid level gauge, and shows its advantages in a large range that Only one moving indicator replaces several magnetic flaps. It also overcomes the difficulty of reading numerical values from a glass level gauge. At the same time, it overcomes the problem of high energy consumption of glass level gauges and magnetic flip level gauges. And it also overcomes many defects such as large friction, low accuracy, large lag, and poor reliability that the liquid level gauges has. Therefore, the invention solves the problem of inaccuracy or unreliability that the existing measurement indicates as that it has a high cost performance, and extremely wide applicability, and particularly solving the world-class-problem for the liquid level gauge with this kind of structure used in the liquid level measurement in case of such as high temperature, high pressure or high pressure and low density medium and that a glass level gauge can't be used.

At the same time, the cost of manufacturing and the cost of use and maintenance have been greatly reduced to meet the needs of more users; compared with the cost of a few yuan/piece on the linear bearings and over a hundred yuan/m on the linear guide, the cost on the entire moving indicator of the invention is only about 10 yuan, wherein guide rail of the moving indicator needs only several yuan/m. The requirement on the matching precision of the moving indicator guide rail and the rolling wheel of the invention is low, the moving indicator guide rail can be formed once by the aluminum profile without further processing, thereby greatly reducing the cost;

Moreover, manufacturing and maintenance are easier. The longer guide rail with high-precision is difficult to manufacture; and when the range is large, only a plurality of pairs can be used, which is a difficult task on site. The invention avoids this problem: The single-piece length of the once-forming aluminum profile for the moving indicator guide rail of the invention can reach at least 6 meters, thereby reducing the number of joints between the guide rails. This not only reduces the cost but also makes the manufacture and maintenance easier and the use more reliable;

Moreover, the moving indicator and its rolling system have simple structure, and manufacturing, assembly, adjustment, installation, on-site calibration, and future maintenance are all easier.

At the same time, the moving indicator with less weight will be more widely applicable, such as in the case where the liquid density is small, and even be used without counter-weight.

In addition, the magnetic steel member on the moving indicator is located outside the ball float chamber, far from the ball float chamber so that it is not apt to demagnetize; and even if the magnet is demagnetized, it is easier to replace it; consequently a series of troubles and losses, such as disassembly, sealing replacement, water pressure test, and airtight test are required for each replacement of the magnetic ball float, are eliminated. particularly for the replacement of the imported magnetic ball float, it'll be is more costly.

The provision of a spare moving indicator eliminates the trouble of replacing the moving indicator as usual.

In addition, when the pointer of the moving indicator is made of red or made of light-emitting materials, its indication and display are very eye-catching and intuitive;

The use of the protective layer of the present invention more effectively improves the high temperature resistance, high pressure resistance, and corrosion resistance of the liquid level gauge, such as a ferromagnetic material ball float coated with an anti-corrosion layer, so that the ball float can withstand higher temperature, higher pressure, and the performance of corrosion resistance thereof is further improved;

The heat-insulation layer or cold-insulating layer is designed to achieve energy-saving effect. The outer wall of the ball float chamber allows for insulation, and the insulation thickness can meet the requirements within a few millimeters; At the same time, it is safer to use, for example, it will not cause fires, explosions, or burn people. For cold pipelines, it is not apt to frost or freeze;

Compared with buoyancy level gauges used in high temperature and high pressure applications, which is subject to the temperature-resistance limitation of the electronic components thereof, and the not-allowed-to-be-insulated parts close to the transmitter or heat sinks are added at the same time, resulting in energy consumption, easy burns and other problems; whereas for this invention, there is no need to worry about it.

In summary, more than six years of theoretical research and various experiments and tests has proved that the structure of the present invention overcomes various deficiencies of the prior art and solves a technical problem urgent to be solved in the field: Its technical effect is mainly reflected in its great reduction in mechanical friction, small lag, high precision, simple structure, great cost reduction, breakthrough improvement in stability and reliability; and its comprehensive performance index is far better than magnetic float level gauge imported from Europe and the United States and other countries. So it can replace imports and earn foreign exchange through export and and its application prospect is extremely wide.

Figure 1:
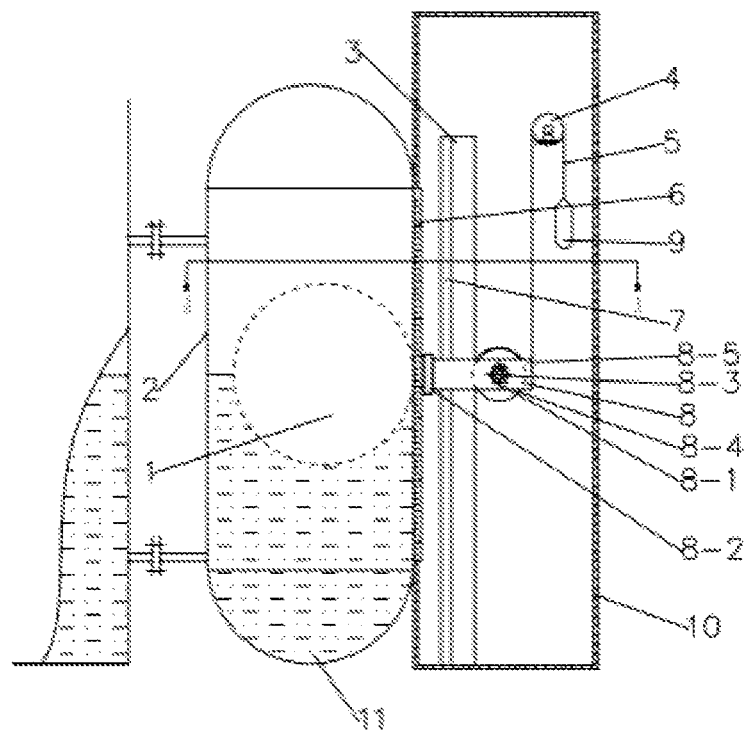
FIG. 1 is a schematic structural view of Embodiment 1.

In the drawings:
1. Ball float, 2. Ball float chamber, 3. Cylindrical guide rail, 3'. Cuboid-shaped guide rail, 4. Fixed pulley, 5. Connecting rope, 6. Calibrated Scale, 7. Guide-rail stiffener, 8. Moving indicator, 8-1, 8-1'. Rolling bearings, 8-2. Magnetic steel member, 8-3, 8-3'. Shaft, 8-4, 8-4'. rolling wheel, 8-5. Rectangular frame, 8-41. arc-shaped groove of rolling wheel, 8-42 Rectangular groove of the rolling wheel, 8-43. Trapezoidal groove of the rolling wheel, 9. Balance hammer, 10. Moving indicator chamber, 11. Liquid medium in the ball float chamber, 12. Float, 13. Magnetic steel outside for fixing the spare moving indicator, 14. Spare moving indicator, 15. Liquid medium in the moving indicator chamber, 16. Guide rail of the ball float.

DETAILED DESCRIPTION OF THE PREFERRED EMBODIMENTS

Embodiment 1

(1) Basic Type

Figure 2:
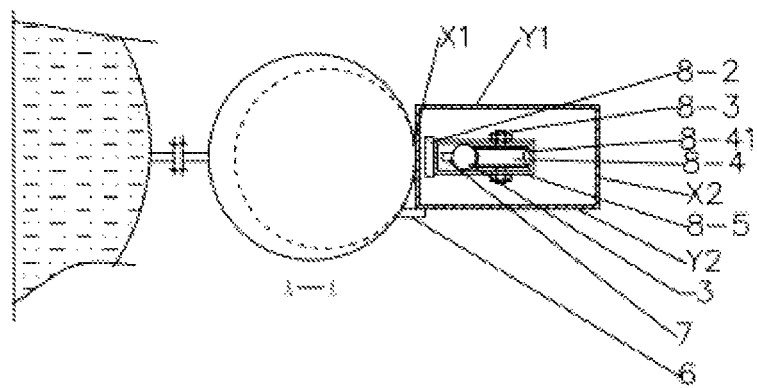
FIG. 2 is A-A sectional view of FIG. 1.

A ball float type liquidometer with moving indicator, as shown in FIG. 1 and FIG. 2, comprises a non-ferromagnetic ball float chamber 2, a ferromagnetic spherical ball float 1 in the ball float chamber 2, and a calibrated scale 6 outside of the ball float chamber 2 and closed to the latter, a cylindrical guide rail 3, and a closed moving indicator chamber 10 made of non-ferromagnetic transparent material, the calibrated scale 6, The axis of the cylindrical guide rail 3 and the axis of the moving indicator chamber 10 are parallel to each other and parallel to the axis of the ball float chamber 2, the moving indicator 8 and the cylindrical guide rail 3 are respectively arranged in the moving indicator chamber 10.

The cylindrical guide rail 3 is provided with a guide rail stiffener 7 from the top to the bottom on one side of the guide rail close to the ball float chamber.

Wherein the moving indicator 8 comprises a magnet steel member 8-2, a rectangular frame 8-5, and a rolling system; and the rolling system comprises a rolling wheel 8-4 with a radial groove along its circumferential surface, a shaft 8-3 and a rolling bearing 8-1;

The rectangular frame 8-5 has four sides X1, X1, Y1, Y2 perpendicular to the horizontal plane;

The magnetic steel member 8-2 is located between the ball float chamber 2 and the rectangular frame 8-5 and is fixed on the outside of the side X1 of the rectangular frame 8-5, and the side X1 is close to the ball float chamber 2, and one magnetic pole of the magnet steel member 8-2 is directly oriented toward the ball float 1;

The shaft 8-3 is Parallel to the ground supported on the two parallel sides Y1 and Y2 of the rectangular frame 8-5, and the two parallel sides Y1 and Y2 are planes perpendicular to the side X1 where the magnetic steel member is fixed.

The rolling system comprises a rolling wheel, a rolling bearing and a shaft, which three are coaxial; the rolling wheel is provided with a radial groove along a circumferential surface; the rolling bearing inner ring is in interference fit with the shaft; the outer ring of the rolling bearing is in interference fit with the rolling wheel and rotates with it;

The cylindrical guide rail 3 of the moving indicator is sheathed in the rectangular frame 8-5 and located between the magnet steel 8-2 and the rolling system;

The rolling system achieves that the rolling wheel 8-4, at its groove position, fits with the working surface of the cylindrical guide rail 3 and rolls up and down along the cylindrical guide rail through the magnetic coupling force between the magnetic steel member 8-2 and the ball float. And the radial groove of the rolling wheel is a concave arc-shaped groove 8-41 corresponding to the arc surface of the cylindrical guide rail.

Figures 3A, 3B:
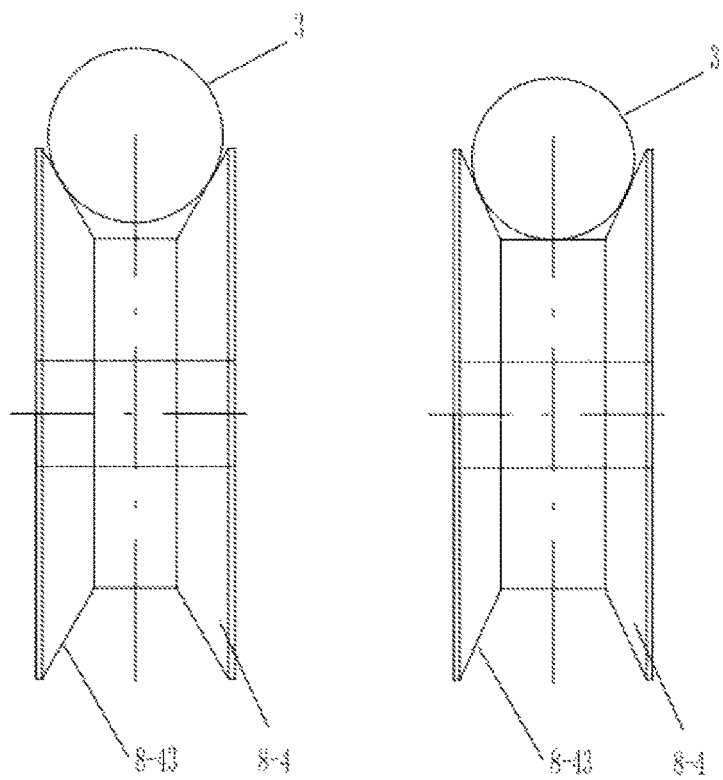
FIG. 3(a), FIG. 3(b) are schematic diagrams of two forms respectively of the matching of the rolling wheel with trapezoidal groove and the moving-indicator guide rail.

The radial groove of the rolling wheel may also be a trapezoidal groove 8-43, as shown in FIG. 3(a) and FIG. 3(b), that is, the trapezoidal groove 8-43 is a corresponding structure with a big outer width and a small inner width similar to a belt pulley. The rolling wheel, as shown in FIG. 3(a), at least at the two inner slopes formed by the trapezoidal bevels of the trapezoidal groove 8-43, fits the working surface of the cylindrical guide rail 3 and rolls up and down along the cylindrical guide rail 3 through the magnetic coupling force between the magnetic steel member and the ball float. Or else, the rolling wheel, as shown in FIG. 3(b), at three inner sides of the trapezoidal groove 8-43, is affixed to the cylindrical guide rail 3, and is rolled up and down along the cylindrical guide rail 3.

(2) Protective Type

Due to the dustproof and waterproof considerations and to avoid the influence of frost, rain, and snow on the instrument, the liquidometer may further comprises a closed moving indicator chamber 10 of non-ferromagnetic transparent material located adjacent to the ball float chamber 2 with the axes of the two paralleling; and the moving indicator 8 and the cylindrical guide rail 3 are installed in the moving indicator chamber 10. The moving indicator chamber 10 of which projection size of the upper part is slightly larger than that of the upper part of the moving indicator; and viewed from above, it is a structure of square box. At room temperature, the rectangular projection size of the upper part of the moving indicator chamber 10 is preferably 0.05-0.08 mm in each side larger than that of the moving indicator. For high or low temperature applications, the thermal expansion and contraction of the moving indicator chamber 10 and that of the moving indicator 8 should be considered respectively.

(3) Fixed Pulley Type

In addition, for some occasions, such as high temperature and high pressure or high pressure and low density media application, due to the large wall thickness of the ball float 1, the specific gravity of the ball float 1 is greater than the specific gravity of the measured medium. In order to balance the gravity of the ball float 1, it is necessary to give the ball float 1 an upward lifting force, and then the fixed pulley 4, balance hammer 9, and the connecting rope or the coupling band 5 may be set on the basis of the above technical solution. The fixed pulley 4 is fixed above the inside of the moving indicator chamber 10, and the connecting rope or the coupling band 5 passes across the fixed pulley 4 with the two ends connected with the balance hammer 9 and the rectangular frame 8-5 of the moving indicator 8 respectively.

Under normal circumstances, the weight G3 of the balance hammer 9 is greater than the weight G2 of the moving indicator 8 so that the ball float 1 and the moving indicator 8 always form a tension between the upper and lower, to avoid the formation of dead district in the middle of the magnetic steel member 8-2 between the ball float 1 and the moving indicator 8 and then lagging. The magnitude of this pulling force is greater than the mechanical friction force f including both on the moving indicator and the ball float during movement and less than the difference value of the maximum magnetic coupling force of the ball float 1 and the moving indicator 8 minus the aforementioned mechanical friction force f. The gravity G1 of the ball float 1 is greater than the difference value of the gravity G3 of the balance hammer 9 minus the gravity G2 of the moving indicator 8 and less than the pull force required to overcome the magnetic coupling force and separate the ball float 1 and the moving indicator 8 apart minus the mechanical friction force f, leaving a safety margin as well. For example, the gravity G1 of the ball float 1 minus the buoyancy F1 of the ball float 1 when the ball float 1 is immersed in the liquid half is equal to the gravity G3 of the balance hammer 9 minus the gravity G2 of the moving indicator 8 and minus again the mechanical friction force f. At this time, the magnetic coupling force must be greater than the gravity force G3 of the balance hammer 9 minus the gravity G2 of the moving indicator 8 and plus again the mechanical friction force f.

Embodiment 2

Figure 4:
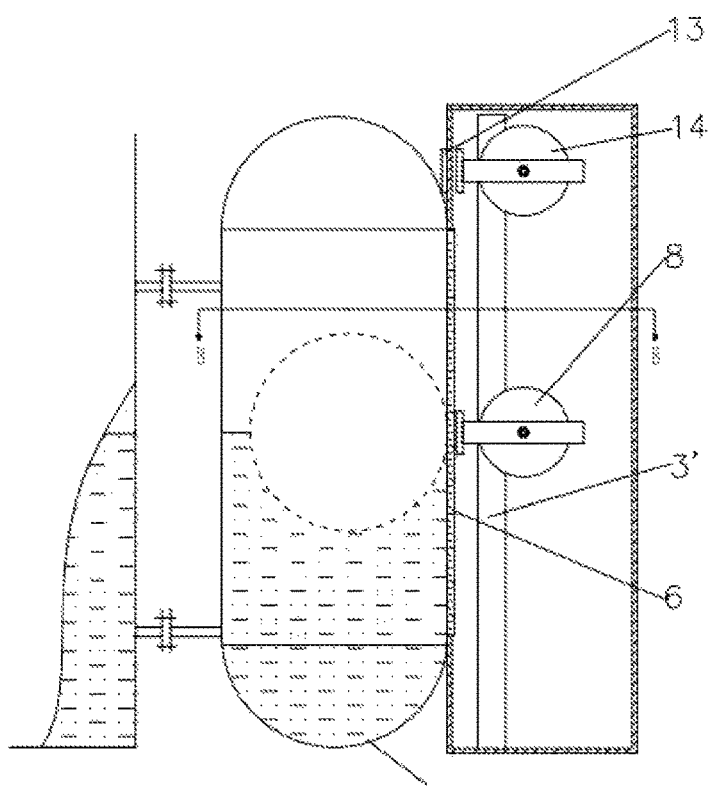
FIG. 4 is a schematic structural view of Embodiment 2.
Figure 5:
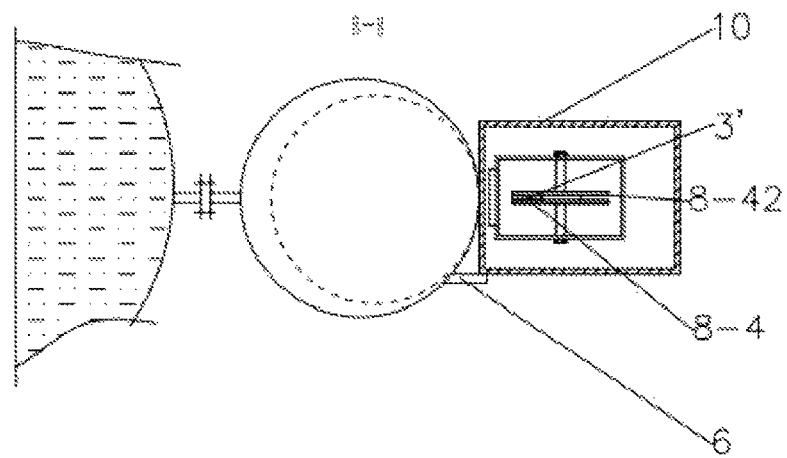
FIG. 5 is B-B sectional view of FIG. 4.

Another ball float type liquidometer with moving indicator, as shown in FIG. 4 and FIG. 5, differs from the protective type of embodiment 1 in that the moving indicator guide rail is a cuboid-shaped guide rail 3'; correspondingly, the radial groove of the rolling wheel 8-4 is a rectangular groove 8-42. The distance between the two inner parallel surfaces of the rectangular groove 8-42 is larger than the corresponding distance between two outer surfaces of the guide rail 3'. Under the magnetic coupling force between the magnetic steel member 8-2 and the ball float 1 of the moving indicator 8, the rolling wheel 8-4 rolls along the working surface of the cuboid-shaped guide rail 3'.

Further, in order to avoid the trouble caused by replacing the magnetic steel member 8-2 after demagnetization of the magnetic steel member 8-2, the liquidometer is provided with a spare moving indicator 14 at an upper position inside the moving indicator chamber 10 and a magnetic steel 13 fixed by fasteners on the outside of the moving indicator chamber 10 for fixing the spare moving indicator 14, and the spare moving indicator 14 is fixed through the magnetic coupling force between the magnet steel 13 and the magnetic steel member of the spare moving indicator 14.

Embodiment 3

Figure 6:
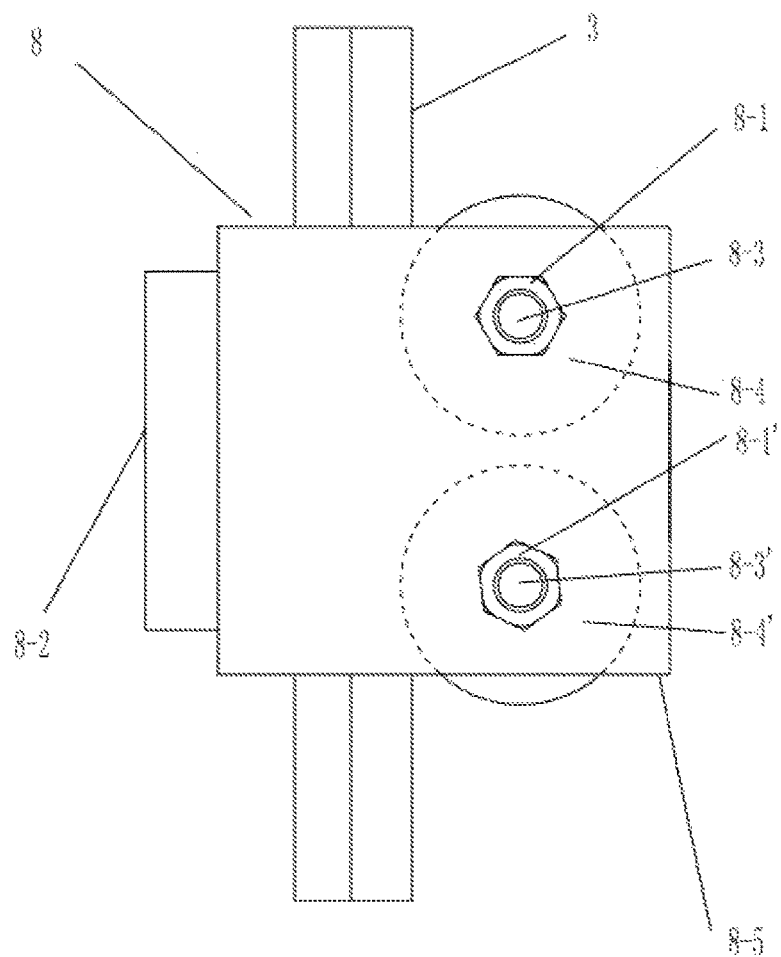
FIG. 6 is a schematic structural view of the upper and lower two rolling wheels of Embodiment 3.

Another ball float type liquidometer with moving indicator, based on the above-mentioned liquidometer, the moving indicator 8 is improved, that is, the moving indicator 8 comprises two sets of the rolling systems, ie, comprises two rolling wheels 8-4,8-4' and their respective shafts 8-3,8-3' and rolling bearings 8-1,8-1', as shown in FIG. 6; wherein the two sets of rolling systems one on top of the other are fixed in parallel and sheathed in the same rectangular frame 8-5, and the plane formed by the two shafts 8-3, 8-3' thereof is perpendicular to the ground surface, thereby preventing the moving indicator 8 from rotating around the shaft during the up and down movement; accordingly the accuracy and reliability are improved.

Embodiment 4

Figure 7:
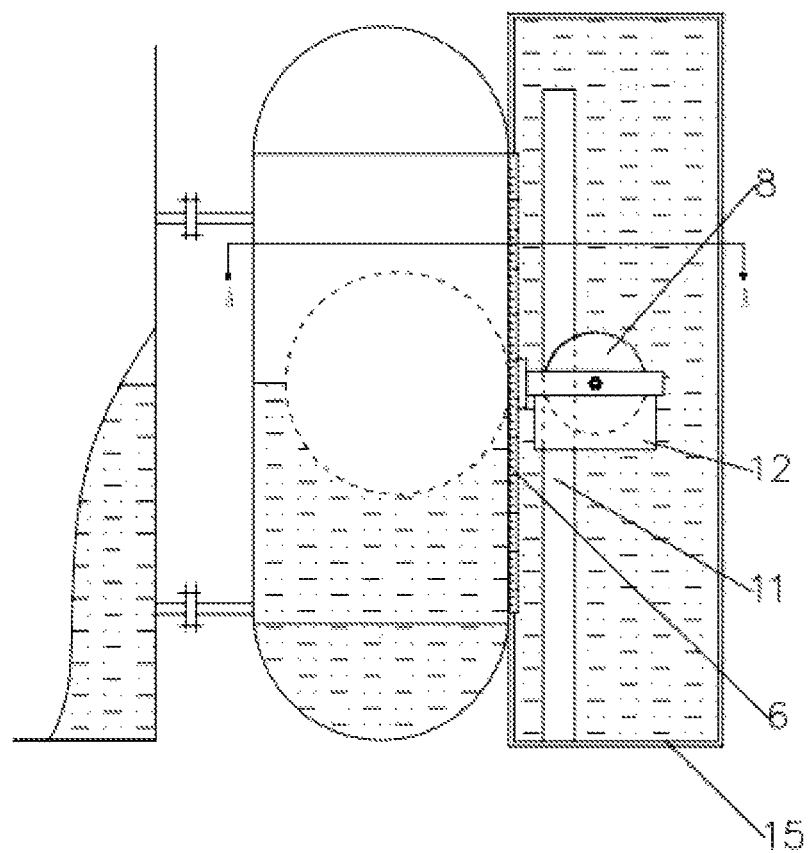
FIG. 7 is a schematic structural view of Embodiment 4.

Another ball float type liquidometer with moving indicator, as shown in FIG. 7, based on the technical solutions of the various liquidometer mentioned above, in consideration of the need to balance the buoyancy of the floating ball 1, a float 12 is fixed under the moving indicator 8 to constitute a buoy. The float 12 may also be above the moving indicator 8; and at the same time, the moving indicator chamber 10 is filled with a liquid medium 15 to provide a buoyancy to the moving indicator or buoy.

The specific gravity of the moving indicator is less than that of the liquid medium 15 in the moving indicator chamber 10. In the equilibrium state, the buoyancy F2 of the moving indicator 8 minus the gravity G2 of the moving indicator 8 is equal to the gravity of G1 of the ball float 1 minus the buoyancy F1 of the ball float 1 when it is immersed in the liquid half. That is, $F2-G2=G1-F1$.

Embodiment 5

Figure 8:
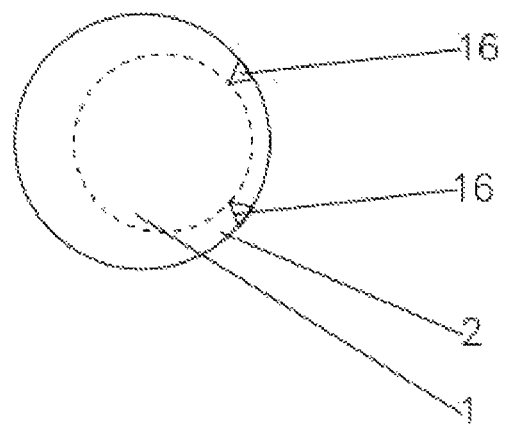
FIG. 8 is a schematic structural view of Embodiment 5.
Figure 9A:
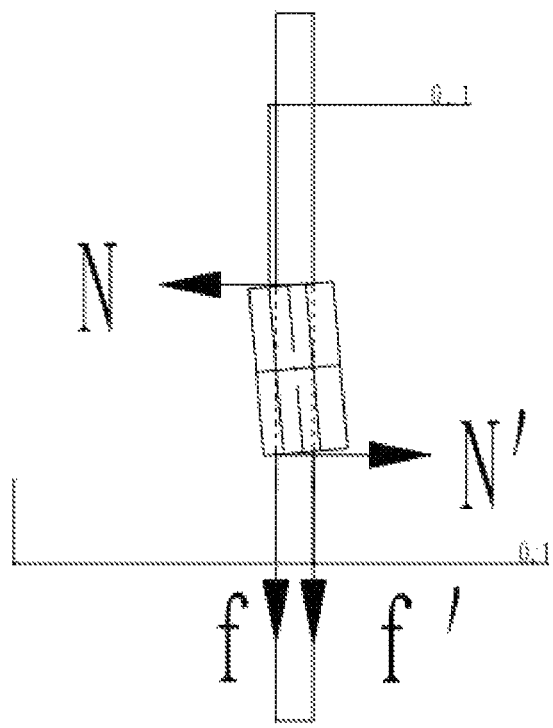
FIG. 9(a) is a force analysis diagram on the friction between the rolling wheel with rectangular groove and the guide rail.
Figure 9B:
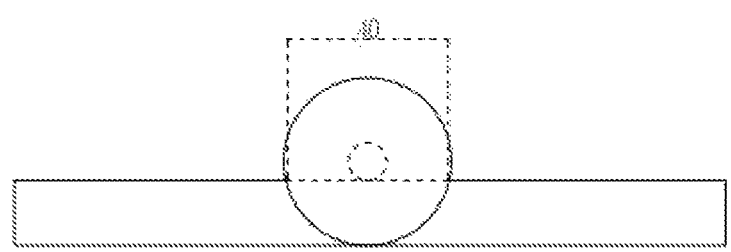
FIG. 9(b) is a left view of FIG. 9(a).

As shown in FIG. 8, on the basis of the various liquidometer mentioned above, in order to further avoid the impurities contained in the liquid medium 11 in the ball float chamber affecting the rolling of the ball float 1, two convex ball float guide rails 16 is furnished on the inner wall of the ball float chamber 2 near the moving indicator 8 side, so that the ball float 1 will not adhere to the inner wall of the ball float chamber 2 under the support of the ball guide rails 16 when the float ball 1 moves up and down, so as not to get stuck by the impurities.

For various liquidometer provided in the above embodiment, further improvements may be made for different technical effects, such as:

In order to reduce the friction between the rolling wheel and the moving indicator guide rail, the polytetrafluoroethylene protective layer can be covered with the working surface of the radial grooves of the rolling wheel 8-4 (ie, the mating surface where the groove is in close contact with the linear guide rail and rolling along the guide rail).

For the considerations of high temperature resistance, high pressure resistance, corrosion resistance, and lowering of the specific gravity of the ball float 1, the ferromagnetic material ball float 1 can be coated with carbon fiber protective layer.

For the considerations of corrosion resistance, the ferromagnetic material ball float 1 can be surface coated with protective layer, for example, it can be surface coated with the protective layer of polytetrafluoroethylene.

For the considerations of high temperature resistance, high pressure resistance, and corrosion resistance, the ferromagnetic ball float 1 may be surface coated with a high alloy steel protective layer which is high temperature resistant, such as 304, 316 or CrMo steel; or the ball float can be produced by a high alloy steel, such as 2Cr13.

Also for the considerations of corrosion resistance, the ball float chamber 2 may be made of plastic, such as polytetrafluoroethylene, or glass, or the inner wall of a ball float chamber 2 is lined with an anti-corrosion layer.

In order to show the clearly and strikingly, the moving indicator 8 is coated with an awake mark such as red and/or the moving indicator surface is coated with a light emitting layer.

Considering the requirement of heat-insulation or cold-insulation and achieving energy saving, an heat-insulation layer or a cold-insulation layer may be provided between the outer wall of the ball float chamber 2 and the moving indicator 8 or moving indicator chamber 10. The heat-insulating layer may be made of aluminum magnesium silicate material, or it can be made of nano-ceramic material and silicate or aluminum silicate fiber with t a few millimeters thickness. The cold-insulation layer may be a cold insulation material such as polyurethane or urea amine grease. And thus the energy saving is realized.

In order to prevent the moving indicator 8 from accidentally dropping from a high place, a spring or a soft material can be installed under the moving indicator chamber 10.

In order to reduce the weight of the spherical ball float 1, the ball float 1 may be made hollow.

In order to facilitate observation, reduce friction, improve measurement accuracy, and avoid the influence of volatilizing, the liquid medium with transparent and lubricating properties is adopted ad the liquid medium in the moving indicator chamber 10, such as transformer oil or cooking oil.

In order to realize remote transmission, magneto-sensitive elements are arranged from the top to the bottom of the magnetic steel member 8-2 of the moving indicator 8.

When the ball float 1 and the moving indicator 8 are disengaged in use, in order to recouple the two together, a magnetic steel may be held in hand to find the position of the ball float 1, and then pull moving indicator 8 by hand or the magnetic steel is used to draw the moving indicator 8 when the moving indicator chamber 10 exists to near the ball float and release the hand or remove the hand-held magnetic steel.

The inventors did years of equipment management, worked as a designer for pressure vessel and pipeline, committed themselves to research of variety of level gauges, did so many experiments and test, and spent more than six years taking into account accuracy, cost, reliability, maintainability as a whole for solving existing technical problems as well as taking into account various factors such as energy saving, applicable process conditions, market demand, processability, maintenance costs, etc.; and after strength calculation and material selection on the ball float and the ball float chamber, the optimized solution is designed and finally forms the technical solution of the present invention, aiming at solving the needs of the liquidometer for various occasions, comprising solving the level-measurement problem such as in high temperature and high pressure or high pressure low density medium and solving the problem of not suitable for a glass level gauge on many occasions.

Although the invention has been described by reference to particular illustrative embodiments thereof, many changes and modifications of the invention may become apparent to those skilled in the art without departing from the spirit and scope of the invention. It's therefore intended to include within this patent all such changes and modifications as may reasonably and properly be included within the scope of the present invention's contribution to the art.

What is claimed is:

1. A ball float type liquidometer with moving indicator comprising:
  a ball float chamber,
  a ball float of ferromagnetic material,
  a calibrated scale,
  a moving indicator and a guide rail thereof outside of the ball float chamber,
  wherein the moving indicator comprises a magnetic steel member, a frame, and a rolling system that is fixed horizontally and sheathed in the frame;
  wherein the rolling system comprises a rolling wheel, rolling bearings and a shaft, wherein the rolling wheel, rolling bearings and the shaft are coaxial; the rolling wheel is provided with a radial groove along the circumferential surface of the rolling wheel; the inner ring of the rolling bearing matches with the shaft, and the outer ring of the rolling bearing matches with the rolling wheel and rotates with it;
  wherein the shaft is supported by the frame and is parallel to the ground;
  wherein the magnetic steel member is fixed on the outside of one side of the frame, which side is close to the ball float chamber; and a magnetic pole of the magnetic steel member is directly oriented toward the ball float;

wherein the guide rail of the moving indicator is sheathed in the frame between the magnetic steel member and the rolling system;

wherein the rolling wheel, at the radial groove position thereon, is affixed to the working surface of the moving indicator guide rail and rolls up and down along the moving indicator guide rail through the magnetic coupling force between the magnetic steel member and the ball float.

2. The ball float type liquidometer with moving indicator of claim 1 wherein the guide rail of the moving indicator is provided from the top to the bottom on one side thereof close to the ball float chamber with a stiffener.

3. The ball float type liquidometer with moving indicator of claim 1 wherein the guide rail of the moving indicator is a cylindrical guide rail, and the radial groove of the rolling wheel is a trapezoidal groove, the rolling wheel, at least at the two inner slopes formed by the trapezoidal bevels of the trapezoidal groove, fits the working surface of the moving indicator guide rail and rolls up and down along the guide rail through the magnetic coupling force between the magnetic steel member and the ball float.

4. The ball float type liquidometer with moving indicator of claim 1 wherein the rolling system comprises two sets; wherein the two sets of rolling systems one on top of the other are fixed in parallel and sheathed in the same frame, and the plane formed by the two axes thereof is perpendicular to the ground surface.

5. The ball float type liquidometer with moving indicator of claim 1 further comprising a fixed pulley system which is fixed directly above the moving indicator, wherein one end of the connecting rope of the fixed pulley system is connected to a balance hammer and the other end is connected to the frame.

6. The ball float type liquidometer with moving indicator of claim 1 wherein the ferromagnetic ball float is coated with a protective layer of carbon fiber, or polytetrafluoroethylene, or a high alloy steel.

7. The ball float type liquidometer with moving indicator of claim 1 wherein a convex ball float guide rail is furnished on the inner wall of the ball float chamber close to the moving indicator.

8. The ball float type liquidometer with moving indicator of claim 1 wherein the shape of the radial groove on the rolling wheel corresponds to the shape of the place where the guide rail of moving indicator is attached.

9. The ball float type liquidometer with moving indicator of claim 8 wherein the guide rail of the moving indicator is a cuboid-shaped guide rail, and the radial groove of the rolling wheel is a rectangular groove.

10. The ball float type liquidometer with moving indicator of claim 8 wherein the guide rail of the moving indicator is a cylindrical guide rail, and the radial groove of the rolling wheel is a concave arc-shaped groove corresponding to the arc surface where the cylindrical guide rail is attached.

11. The ball float type liquidometer with moving indicator of claim 10 wherein the diameter of the concave arc-shaped groove of the rolling wheel is larger than the diameter of the cylindrical guide rail.

12. The ball float type liquidometer with moving indicator of claim 1 further comprising a closed moving indicator chamber of non-ferromagnetic transparent material located adjacent to the ball float chamber with the axes of the two parallelling; and the moving indicator and the guide rail thereof are installed in the moving indicator chamber.

13. The ball float type liquidometer with moving indicator of claim 12 further comprising a fixed pulley system which is fixed directly above the moving indicator, wherein one end of the connecting rope of the fixed pulley system is connected to a balance hammer and the other end is connected to the frame.

14. The ball float type liquidometer with moving indicator of claim 12 wherein the ferromagnetic ball float is coated with a protective layer of carbon fiber, or polytetrafluoroethylene, or a high alloy steel.

15. The ball float type liquidometer with moving indicator of claim 12 wherein a convex ball float guide rail is furnished on the inner wall of the ball float chamber close to the moving indicator.

16. The ball float type liquidometer with moving indicator of claim 12 further comprising a spare moving indicator which is located in the upper part of the moving indicator chamber and fixed through a magnetic steel fixed outside of the moving indicator chamber.

17. The ball float type liquidometer with moving indicator of claim 16 further comprising a fixed pulley system which is fixed directly above the moving indicator, wherein one end of the connecting rope of the fixed pulley system is connected to a balance hammer and the other end is connected to the frame.

18. The ball float type liquidometer with moving indicator of claim 12 wherein a liquid medium is filled in the moving indicator chamber, and a buoy is provided in the moving indicator chamber; wherein the buoy comprises the moving indicator and a float fixed on the moving indicator.

19. The ball float type liquidometer with moving indicator of claim 18 further comprising a fixed pulley system which is fixed directly above the moving indicator, wherein one end of the connecting rope of the fixed pulley system is connected to a balance hammer and the other end is connected to the frame.

20. The ball float type liquidometer with moving indicator of claim 18 wherein a convex ball float guide rail is furnished on the inner wall of the ball float chamber close to the moving indicator.

* * * * *